(12) United States Patent
Perry

(10) Patent No.: US 7,537,243 B1
(45) Date of Patent: May 26, 2009

(54) MUD FLAP RETROFIT KIT AND METHOD OF USE

(76) Inventor: William Dennis Perry, 2965 Fish Hatchery Rd., Grants Pass, OR (US) 97527

( * ) Notice: Subject to any disclaimer, the term of this patent is extended or adjusted under 35 U.S.C. 154(b) by 780 days.

(21) Appl. No.: 10/845,375

(22) Filed: May 13, 2004

(51) Int. Cl.
 *B62D 25/18* (2006.01)
(52) U.S. Cl. ............... 280/847; 280/851; 280/152.3; 280/848
(58) Field of Classification Search .......... 280/154.5 R, 280/851, 847, 152.3, 848; 27/73
See application file for complete search history.

(56) References Cited

U.S. PATENT DOCUMENTS

| | | | | |
|---|---|---|---|---|
| 3,237,963 A | * | 3/1966 | Menzer | 280/851 |
| 3,279,818 A | * | 10/1966 | Jones | 280/851 |
| 3,711,119 A | * | 1/1973 | Hollingsworth | 280/851 |
| 3,953,053 A | * | 4/1976 | Arenhold | 280/851 |
| 4,264,083 A | * | 4/1981 | Matthew et al. | 280/851 |
| 4,268,052 A | | 5/1981 | Sullivan | 280/153 R |
| 4,323,262 A | | 4/1982 | Arenhold | 280/154.5 R |
| 4,726,599 A | * | 2/1988 | Antekeier et al. | 280/851 |
| 4,733,879 A | | 3/1988 | Arenhold | 280/154.5 R |
| 5,048,868 A | | 9/1991 | Arenhold | 280/848 |
| 5,915,708 A | | 6/1999 | Silva | 280/154 |
| 6,827,372 B2 | * | 12/2004 | Barr et al. | 280/847 |

* cited by examiner

*Primary Examiner*—Christopher P Ellis
*Assistant Examiner*—John R Olszewski
(74) *Attorney, Agent, or Firm*—Timothy E. Siegel Patent Law, PLLC

(57) ABSTRACT

A method of installing a mud flap onto a vehicle having a fender which has a contour, so that the mud flap is in a predetermined position. A mud flap installation kit is used. This kit has a mud flap that defines a set of at least three apertures positioned along a curve that parallels the fender contour and a set of flat clips equal in number to the apertures, each flat clip having a bolt and a leaf, defining a leaf aperture. Each flat clip bolt is threaded through a mud flap aperture and a leaf aperture. Then the mud flap is aligned so that each of the apertures is a predetermined distance from the fender, thereby placing the mud flap in the predetermined position. Finally, the flat clips are used to clamp the mud flap to the fender.

16 Claims, 2 Drawing Sheets

MUD FLAP RETROFIT KIT AND METHOD OF USE

BACKGROUND OF THE INVENTION

Many owners of pickup trucks and vans choose to install third party mud flaps to provide enhanced protection against gravel, dirt, ice and mud flung up by the vehicle tires. Unfortunately, it is becoming more difficult to install third party mud flaps because in modern day truck construction, with the current emphasis on reducing vehicle weight and assembly complexity, less fender structure is available on which to attach mud flap fastening elements.

U.S. Pat. Nos. 4,323,262 and 5,048,868 both issued to Arenhold, disclose two different methods for clamping a mud flap to a fender. Both of these references, however, appear to be directed to providing a universal mud flap kit that could be fit onto a wide variety of vehicles. Unfortunately, this universality detracts from the specific fit of the mud flap kit to any particular vehicle. Because the flap kit allows for flexibility in the scheme of attachment, in order to accommodate various vehicle makes, the installer must use his best judgment during the installation process. On occasion this will result in a mud flap that is installed in an ill positioned manner, thereby not properly protecting the vehicle sides from flung debris. In the alternative, the mud flaps may extend downwardly too far and occasionally touch the roadway, as the vehicle passes through a dip.

SUMMARY OF THE INVENTION

In a first, separate aspect, the present invention is a method of installing a mud flap onto a vehicle having a fender which has a contour, so that the mud flap is in a predetermined position. A mud flap installation kit is used. This kit has a mud flap that defines a set of at least three apertures positioned along a curve that parallels the fender contour and a set of flat clips equal in number to the apertures, each flat clip having a bolt and a leaf, defining a leaf aperture. Each flat clip bolt is threaded through a mud flap aperture and a leaf aperture. Then the mud flap is aligned so that each of the apertures is a predetermined distance from the fender, thereby placing the mud flap in the predetermined position. Finally, the flat clips are used to clamp the mud flap to the fender.

In a second separate aspect, the present invention is a method of installing a mud flap onto a vehicle having a fender design which utilizes a fender fastener aperture and a fender contour. The method makes use of a mud flap installation kit that has a mud flap assembly defining at least a first aperture and a second aperture, the first aperture and the second aperture being positioned so that when the first aperture is aligned to the fender fastener aperture and the second aperture is positioned a predetermined distance from the fender contour, the mud flap assembly is positioned in a predetermined substantially optimal manner. The kit also includes a flat clip having a bolt and a leaf, defining a leaf aperture and a bolt and nut assembly. The bolt and nut assembly is used to bolt the mud flap assembly to the fender by way of the fender fastener aperture and the first aperture. Then the flat clip bolt is threaded through a mud flap aperture and a leaf aperture and the flat clip is used to clamp the mud flap to the fender.

In a third separate aspect, the present invention is a set of mud flap installation kits. A first mud flap installation kit of the set includes a first mud flap having a set of apertures designed to optimize installation to a first vehicle fender and a set of clips, each clip designed to be engaged to an aperture and used to clamp the mud flap to the first vehicle fender. A second mud flap installation kit includes a second mud flap having a set of apertures designed to optimize installation to a second vehicle fender having a different shape from the first vehicle fender. The second also includes a set of clips, each designed to be engaged to an aperture and used to clamp the mud flap to the second vehicle fender.

In a fourth separate aspect, the present invention is a method of designing a mud flap installation kit. This kit is adapted to be installed onto a particular make of vehicle that includes a fender defining a fender curve. The kit is designed so that the mud flap will be installed at a predetermined position on the vehicle after installation is complete. First, the fender curve is measured. The location of at least one aperture in the fender is determined. Then a set of mud flap aperture locations is determined wherein a first aperture location is adapted to be aligned to the fender aperture and a set of second aperture locations are adapted to be spaced a predetermined distance from the fender curve when the first aperture has been aligned to the fender aperture and the mud flap is in the predetermined position. The predetermined distance coincides with the distance necessary to install a flat clip through the aperture so that it can be clamped onto the fender.

In a fifth separate aspect, the present invention is a motor vehicle having a fender and a mud flap defining a set of at least three apertures positioned along a curve that parallels the fender contour. Also, a set of flat clips equal in number to the apertures, each flat clip having a bolt and a leaf, defining a leaf aperture and having each flat clip bolt threaded through a mud flap aperture and the leaf aperture with the leaf being tightly held against the fender by the bolt.

The foregoing and other objectives, features and advantages of the invention will be more readily understood upon consideration of the following detailed description of the preferred embodiment(s), taken in conjunction with the accompanying drawings.

DETAILED DESCRIPTION OF THE PREFERRED EMBODIMENT(S)

Figure 1:
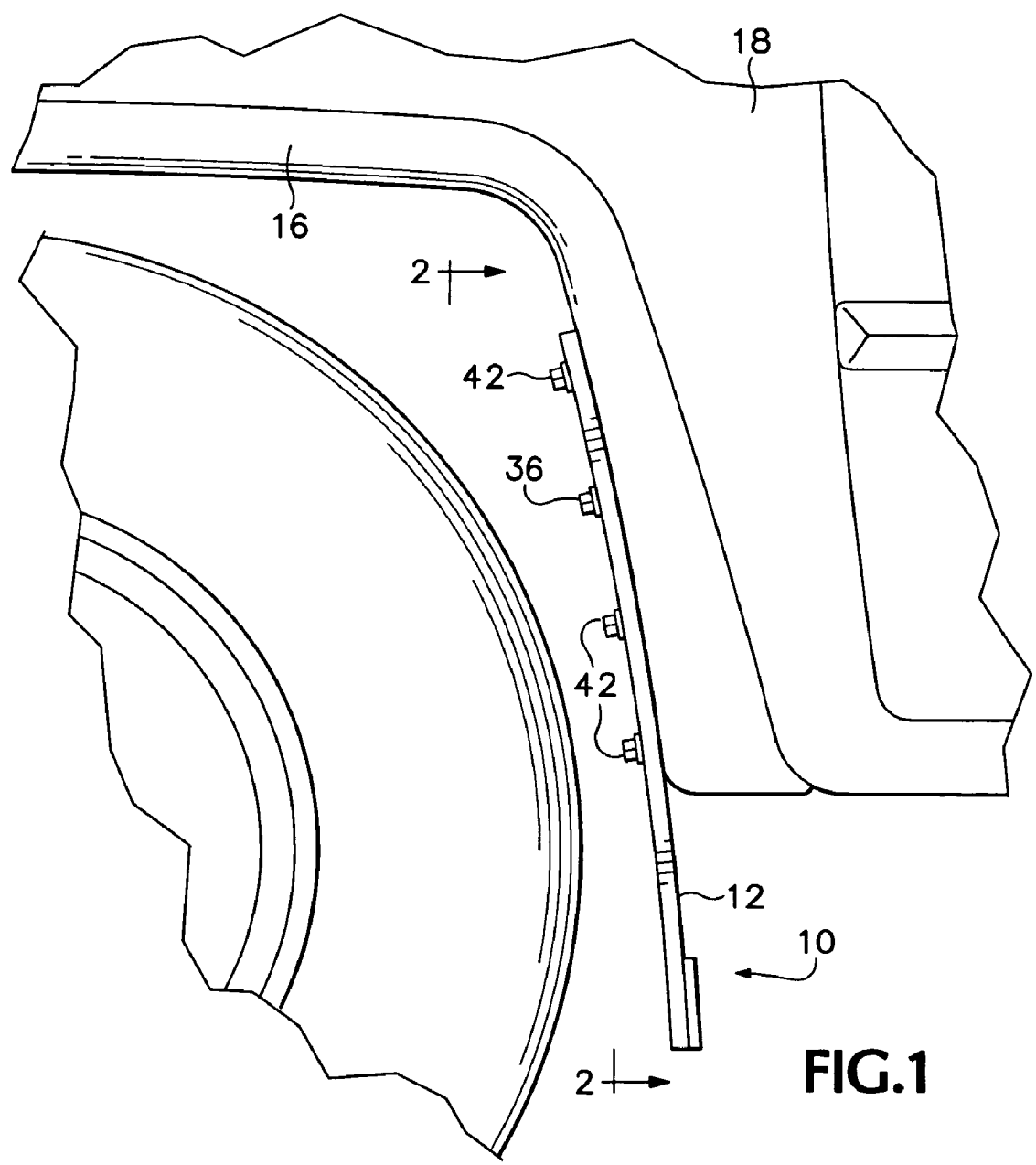
FIG. 1 is a side view of a mud flap installed onto a fender according to the present invention.
Figure 2:
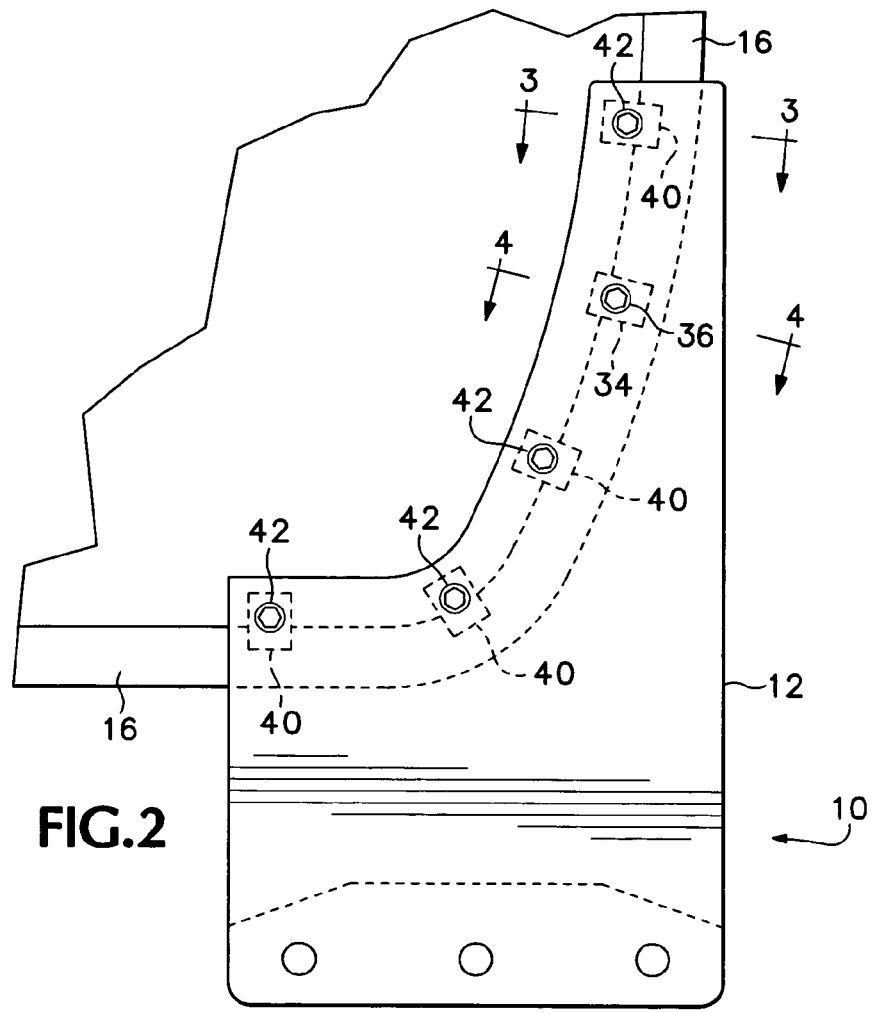
FIG. 2 is a front view of the installed mud flap of FIG. 1.

Referring to FIGS. 1 and 2, a preferred embodiment of the present invention takes the form of a mud flap installation kit 10 (shown installed), including a mud flap assembly 12, which in the case shown is merely a mud flap but which could include a mounting bracket. A first mud flap aperture 14 (FIG. 4) defined by mud flap 12 is positioned (coincident with bolt 36, FIG. 2) so as to be aligned to a fender fastener aperture 15 in a fender 16 of a specific type (i.e. make) of vehicle 18 (FIG. 1). A set of second mud flap apertures 20 (FIG. 3) are positioned (coincident with bolts 42, FIG. 2) so that when the first mud flap aperture 14 is aligned to the fender aperture 15, apertures 20 may be positioned so that each one is a predetermined distance to the curve of the fender 16.

In addition, kit 10 includes a U-clip assembly 30 for use with the first aperture 14 and a flat clip assembly 32 for each one of apertures 20. The U-clip assembly 30 includes a clip 34, a bolt 36 and a nut 38. Each flat clip assembly includes a leaf 40, a bolt 42 and a nut 44.

Kit 10 is produced for a specific make of truck or for a family of trucks that all have the same fender configuration.

Instructions provided with kit 10 explain which fender aperture 15 should be used and explain that the factory installed fastener in aperture 15 must be removed in order to permit the use of the fender aperture 15 in the installation of mud flap 12. In modern truck construction it is not unusual for an inexpensive plastic rivet to be used in the fender aperture 15 for holding the fender together to other parts of the vehicle. This type of rivet is easily removed. Unfortunately the material in which the fender aperture 15 is defined may be too weak to affirmatively retain mud flap 12. Additional first apertures 14 and U-clip assemblies 30 may be included in kit 10 to exploit additional fender fastener apertures when possible.

Figure 4:
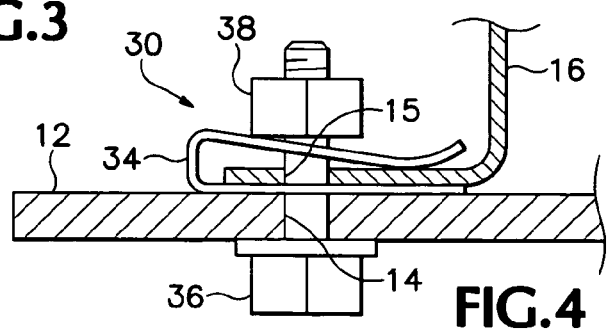
FIG. 4 is a side view of a U-clip as used in FIG. 1.

Referring to FIG. 4, the U-clip 34 is positioned about fender fastener aperture 15 to act as a reinforcing element for this weak material. Bolt 36 is threaded through the first mud flap aperture 14, U-clip 34 and fender aperture 15 and is retained by nut 38. At this point in the installation process a point on the mud flap 12 has become affirmatively fixed to a point on fender 16. This serves to take the guesswork out of the installation and to ensure that the mud flap 12 will be positioned in a predetermined, substantially optimal position on the fender 16, as each flat clip assembly 32 now must be installed in a predetermined aperture and be attached to a predetermined point along the curve of the fender.

Figure 3:
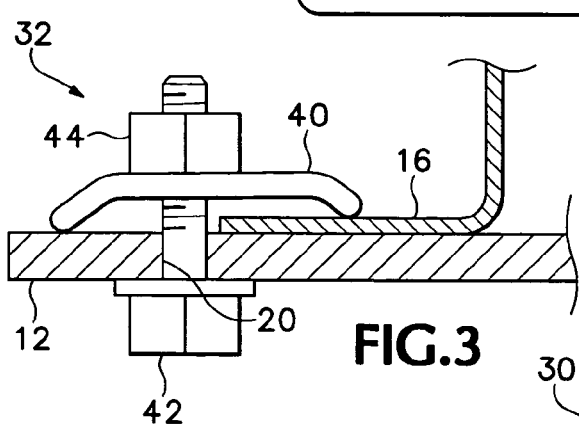
FIG. 3 is a side view of a flat clip as used in FIG. 1.

Referring to FIG. 3, for each mud flap second aperture 20, a bolt 42 is threaded through a leaf 40, the mud flap second aperture 20 and secured by a nut 44. Leafs 40 are then secured to the fender 16 and nuts 44 are tightened to retain the mud flap on the fender 16.

As a different mud flap installation kit is required for each substantially different fender shape, in one preferred embodiment a set of mud flap installation kits 10, having at least a first kit 10 adapted to be installed onto a fender having a first shape and a second kit 10 adapted to be installed onto a fender having a second shape is assembled in a store for the purpose of selling mud flap installation kits to drivers of several different makes of automobiles. In another aspect of the invention a mud flap having a first shape and/or arrangement of apertures is installed onto a first vehicle and a mud flap having a second shape and/or arrangement of apertures is installed onto a second vehicle. The invention also encompasses a vehicle having a mud flap that is attached by way of a series of flat clips fitted through mud flap apertures.

In an alternative preferred embodiment, U-clip assembly 30, or similar nut and bolt assembly, attaches to the mud flap assembly 12 by way of a bracket that is included as part of assembly 12 and which is attached to the mud flap that is also part of assembly 12. In the context of this application "fender" includes all of the material defining the wheel well.

The advantages of the mud flap installation kits and installed mud flaps of the present invention may now be evident. The mud flaps are affirmatively attached by way of a bolt that passes through both an aperture 14 on the mud flap and an aperture 15 on the fender. Also, the mud flap apertures 20 establish a predetermined curve of attachment for flat clamp assemblies 32, so that the position and orientation of the installed mud flap 12 is substantially predetermined by the positioning of the apertures 14 and 20.

The terms and expressions that have been employed in the foregoing specification are used as terms of description and not of limitation. There is no intention, in the use of such terms and expressions, of excluding equivalents of the features shown and described or portions thereof, it being recognized that the scope of the invention is defined and limited only by the claims which follow.

The invention claimed is:

1. A method of installing a mud flap onto a vehicle having a fender, said fender having a fender fastener aperture bearing a fender fastener and also having a contour, said method of installing said mud flap including, installing said mud flap in a predetermined position, and comprising:
  (a) providing a mud flap installation kit, having:
    (i) a mud flap having a set of at least three first apertures, each of said apertures positioned along a curve that parallels said fender contour and having a second aperture positioned to align with said fender fastener aperture; and
    (ii) a set of flat clip assemblies equal in number to said first apertures, each said flat clip assembly having a bolt, a leaf, said leaf having a leaf aperture, and a nut adapted to be threaded on said bolt; and
    (iii) a first bolt adapted to fit through said second aperture and said fender fastener aperture and a first nut adapted to be threaded onto said first bolt;
  (b) removing said fender fastener from said fender fastener aperture;
  (c) aligning said second aperture to said fender fastener aperture and threading said first bolt through said second aperture and said fender fastener aperture and threading and tightening said first nut onto said first bolt;
  (d) threading each said flat clip assembly bolt through a first aperture and a leaf aperture;
  (e) aligning said mud flap so that each said first aperture is a predetermined distance from said fender, thereby placing said mud flap in said predetermined position; and
  (f) threading and tightening said flat clip assembly nuts on said flat clip assembly bolts, thereby using said flat clip assemblies to clamp said mud flap to said fender.

2. The method of claim 1 wherein said fender is reinforced about said fender fastener aperture prior to threading said first bolt through said fender fastener aperture.

3. The method of claim 1 further providing a U-clip and reinforcing said fender by placing said U-clip about said fender fastener aperture prior to threading said first bolt through said fender fastener aperture.

4. A method of installing a mud flap onto a vehicle having a fender having a fender fastener aperture and a fender contour, comprising:
  (a) providing a mud flap installation kit, having:
    (i) a mud flap assembly having at least a first aperture and a second aperture, said first aperture and said second aperture being positioned so that when said first aperture is aligned to said fender fastener aperture and said second aperture is positioned a predetermined distance from said fender contour, then said mud flap assembly is positioned in a predetermined substantially optimal manner; and
    (ii) a flat clips clip assembly having a bolt, a leaf, said leaf having a leaf aperture, and a nut; and
    (iii) a bolt and nut assembly;
  (b) using said bolt and nut assembly to bolt said mud flap assembly to said fender by way of said fender fastener aperture and said first aperture; and
  (c) threading said flat clip assembly bolt through a second aperture of the mud flap and said leaf aperture and threading and tightening said flat clip assembly nut to said flat clip assembly bolt, thereby using said flat clip assembly to clamp said mud flap to said fender.

5. The method of claim 4, wherein said mud flap assembly includes a mud flap only.

6. The method of claim 4, wherein said mud flap installation kit includes additional flat clip assemblies and said mud flap assembly has additional second apertures and wherein said method uses said additional flat clip assemblies to more thoroughly clip said mud flap assembly to said fender by way of said additional second apertures.

7. A set of mud flap installation kits comprising:
   (a) a first mud flap installation kit, including:
      (i) a first mud flap having a first set of apertures designed to optimize installation to a first vehicle fender;
      (ii) a set of clips, each said clip designed to be engaged to one of said first set of apertures and used to clamp said mud flap to said first vehicle fender; and
   (b) a second mud flap installation kit, including:
      (i) a second mud flap having a second set of apertures arranged differently from said first set of apertures and designed to optimize installation to a second vehicle fender having a different shape from said first vehicle fender;
      (ii) a set of clips, each said clip designed to be engaged to one of said second set of apertures and used to clamp said mud flap to said second vehicle fender; and
   (c) whereby a mud flap kit is available for retrofitting either one of two different vehicles.

8. The set of claim 7, further including mud flap installation kits adapted to be installed onto fenders having additional varying shapes.

9. The set of claim 7 wherein said first vehicle fender includes a fender fastener aperture bearing a fender fastener and wherein the first mud flap in the first mud flap kit has at least one second aperture positioned to align with said fender fastener aperture.

10. The set of claim 9 wherein said first kit includes a fender reinforcing element to reinforce said first vehicle fender about said fender fastener aperture.

11. The set of claim 10 wherein said reinforcing element is a U-clip.

12. A method of designing a mud flap installation kit, adapted to be installed onto a particular type of vehicle that includes a fender having a fender curve, in such a manner that a mud flap will be installed at a predetermined position on said vehicle after installation is complete, and will be attached to said fender using a predetermined type of clip assembly, that includes a bolt and a predetermined type of clip, said method comprising:
   (a) measuring said fender curve;
   (b) finding at least one aperture in said fender;
   (c) determining a set of aperture locations, wherein a first aperture location is adapted to be aligned to said fender aperture and a set of second aperture locations are adapted to be spaced a predetermined distance from said fender curve when said first aperture has been aligned to said fender aperture and said mud flap is in said predetermined position, said predetermined distance coinciding with the distance necessary to install said predetermined clip assembly with said bolt of said predetermined type of clip threaded through said second aperture so that said predetermined type of clip can be clamped onto said fender.

13. A motor vehicle having a fender and further comprising:
   (a) a mud flap having a set of at least three apertures positioned along a curve that parallels said fender contour; and
   (b) a set of flat clip assemblies equal in number to said apertures, each said flat clip assembly having a bolt, a leaf, said leaf having a leaf aperture, and a nut, each said flat clip assembly bolt being threaded through one of said mud flap apertures and said leaf aperture and said leaf being tightly held against said fender by said flat clip assembly nut tightened to said flat clip assembly bolt.

14. The motor vehicle of claim 13 wherein said fender has a fender fastener aperture and said mud flap includes an additional aperture, and further including an additional bolt threaded through said fender fastener aperture and said mud flap additional aperture and an additional nut tightened to said additional bolt.

15. The motor vehicle of claim 14 wherein said fender is reinforced about said fender fastener aperture.

16. The motor vehicle of claim 15 wherein said fender is reinforced with a U-clip placed about said fender fastener aperture.

* * * * *